Patented May 10, 1932

1,858,177

UNITED STATES PATENT OFFICE

JOHN ALFRED AESCHLIMANN, OF BASEL, SWITZERLAND, ASSIGNOR TO HOFFMANN-LA ROCHE INC., OF NUTLEY, NEW JERSEY, A CORPORATION OF NEW JERSEY

PRODUCT FOR DESTROYING ANIMALS

No Drawing. Application filed September 5, 1929, Serial No. 390,659, and in Germany October 19, 1928.

For destroying pernicious animals, for instance rats, rabbits and other rodents, and for capturing fur-bearing animals, alkaloids, such as strychnine, mixed with corn or other animal foods are very often used. Owing to their bitter taste the animals do not readily take these poisons. Caged rats for instance will not eat pastry containing 2% strychnine. If the bait contains less strychnine, larger quantities will have to be consumed to kill the animal. However, an animal, having once eaten enough poison to bring on symptoms of poisoning, will after its recovery shun the poisoned food, even if there is no other nourishment. The bait should therefore contain enough poison to kill the animal the first time.

It has now been found that urethanes of the structure

$R_1$ and $R_2$ being alkayl or hydrogen, R alkyl and X a salt-forming group, are very strong poisons for warm-blooded animals, especially for rats, mice, rabbits and other rodents. The methylcarbamic ester of m-oxyphenyltrimethylammoniumiodide,

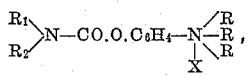

for instance, taken in quantities of 2.5 mg. per og. or 0.1 mg. intravenous to 1 kilogram bodyweight, is sufficient to kill a rat or mouse. In comparison with the products claimed by this invention the hydrochloride of the methylcarbamic ester of m-dimethylaminophenol is about 15 times less poisonous. As the products of this invention have no particular taste, the animals do not refuse to take the foods with which they are mixed. They can be given with any bait in quantities which will kill the animal after it has eaten only a very little of the bait.

However, the decomposability of these compounds, especially in aqueous solution, has proved detrimental to their use (Stedman, Biochemical Journal, 1926, page 733, par. 2). Experiments have shown that stable aqueous solutions of the compounds may be obtained by adding acids thereto.

A solution of the methylcarbamic ester of m-oxyphenyltrimethylammoniumiodide in a dilution of 1:300.000 of the pH 6.2 has lost its poisonous capacity after half an hour. By adding hydrochloric acid or an organic acid to this solution, in order to elevate the hydrogen ionic concentration corresponding to a pH 1-5, its poisonous capacity is maintained even after 48 hours.

In order to prevent the decomposition of these poisons in baits, for instance in pastry of neutral or alkaline reaction, acids should be added. Pastry containing 2% of methylcarbamic ester of m-oxyphenyltrimethylammoniumiodide without the addition of an acid has partly lost its poisonous nature after a fortnight. If tartaric acid is added to the bait, its poisonous capacity will not diminish.

The following examples show in what manner the baits may be prepared:

1. 0.01 g. of the methylcarbamic ester of m-trimethylphenylammonium-methylsulphate, 0.4 g. of powdered biscuit and 0.39 g. of canesugar are thoroughly ground. Tablets can be formed of the mixture.

2. 99 g. of commercial casein are mixed with 1 g. of the 8-methylcarbamic ester of methylquinoliniumiodide.

3. 99 parts of barley groats are mixed with 1 part of the methylcarbamic ester of m-methyldiethylphenylammoniumiodide.

4. 100 parts of oats, wheat or rye are left to soak in water for 24 hours. They are then dried and hereafter mixed with a solution, dyed with methyl red, of 1 part of the methylcarbamic ester of m-trimethylphenylammonium-methylsulphate in 10 parts of 2% tartaric acid solution. These grains are then dried in the open air.

5. 100 parts of oats, wheat or rye are dried at 100° C., whereby they lose about 10% of of their weight. These grains are mixed with a solution of 1 part of the methylcarbamic ester of m-oxyphenyltrimethylammoniumiodide in 10 parts of 2% tartaric acid solution. The grains are then left in the open air for some time.

In order to test the efficacy of the bait, wheat, rye, oats, white bread, mashed potatoes, wheat poisoned with strychnine, corn poisoned with thallium and the poisoned mixture described in Example 1 were set before 5 rats. Three animals went straight for the poisoned mixture, the other two first ate some white bread and then they too partook of the poison. The rats were dead after a few minutes.

For killing a mouse half a grain prepared according to Example 4 or 5 is sufficient. A rat weighing 200 g. was dead after eating two grains of the bait.

I claim:

1. A poisoned food for animals comprising in addition to a food product a urethane derivative of the structure

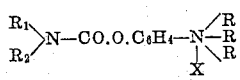

$R_1$ and $R_2$ being selected from a group comprising alkyl radicals, and hydrogen; R representing an alkyl group, and X representing a salt forming group.

2. Food products for destroying animals comprising in addition to a food product a urethane derivative of the structure

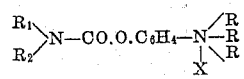

$R_1$ and $R_2$ being selected from a group comprising alkyl radicals, and hydrogen; R representing an alkyl radical, and X representing a salt forming group; and a substance to maintain the mixture acid in reaction.

3. A poisoned food for animals comprising in addition to a food product a urethane derivative of the structure

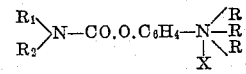

where $R_1$ and $R_2$ are selected from a group comprising alkyl radicals, and hydrogen; R representing an alkyl radical, and X being a salt forming group; and an acid adapted to maintain the mixture acid in reaction.

4. Food products for destroying pernicious animals, comprising in addition to a food product a urethane derivative of the structure

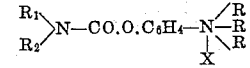

where $R_1$ and $R_2$ are selected from a group comprising alkyl radicals, and hydrogen; R representing an alkyl radical, and X representing a salt forming group; and an acid salt adapted to maintain the product acid in reaction.

5. A poisoned food for pernicious animals comprising in addition to a food product a urethane derivative of the structure

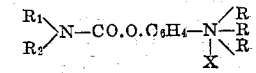

where $R_1$ and $R_2$ are chosen from a group comprising alkyl radicals, and hydrogen; R representing an alkyl radical, and X representing a salt forming group; and a buffer substance adapted to maintain the product acid in reaction.

In witness whereof I have hereunto set my hand.

JOHN ALFRED AESCHLIMANN.